United States Patent
Ansart et al.

[11] Patent Number: 6,070,412
[45] Date of Patent: Jun. 6, 2000

[54] TURBOMACHINE COMBUSTION CHAMBER WITH INNER AND OUTER INJECTOR ROWS

[75] Inventors: Denis Roger Henri Ansart, Bois le Roi; Bruno James, Fontainebleau; Michel André Albert Desaulty, Vert St Denis; Richard Emile Staessen, Chailly En Biere, all of France

[73] Assignee: Societe National d'Etude et de Construction de Moteurs d'Aviation "Snecma", Paris, France

[21] Appl. No.: 09/179,896

[22] Filed: Oct. 28, 1998

[30] Foreign Application Priority Data

Oct. 29, 1997 [FR] France ................... 97 13549

[51] Int. Cl.⁷ ............... F02C 3/14; F23R 3/06; F23R 3/52
[52] U.S. Cl. ................... 60/747; 60/752; 60/746
[58] Field of Search .................. 60/39.36, 746, 60/747, 752, 754, 755, 756, 757

[56] References Cited

U.S. PATENT DOCUMENTS

| | | | |
|---|---|---|---|
| 4,246,758 | 1/1981 | Caruel et al. ................ | 60/747 |
| 5,220,795 | 6/1993 | Dodds et al. ................ | 60/752 |
| 5,284,019 | 2/1994 | Vdoviak . | |
| 5,311,743 | 5/1994 | Ansart et al. . | |
| 5,417,069 | 5/1995 | Alary et al. . | |
| 5,437,159 | 8/1995 | Ansart et al. . | |
| 5,499,499 | 3/1996 | Ambrogi et al. . | |
| 5,501,071 | 3/1996 | Ansart et al. . | |
| 5,524,430 | 6/1996 | Mazeaud et al. . | |
| 5,577,386 | 11/1996 | Alary et al. . | |
| 5,590,531 | 1/1997 | Desaulty et al. . | |
| 5,592,819 | 1/1997 | Ansart et al. . | |
| 5,598,697 | 2/1997 | Ambrogi et al. . | |
| 5,634,328 | 6/1997 | Ansart et al. . | |
| 5,642,621 | 7/1997 | Alary et al. . | |
| 5,651,252 | 7/1997 | Ansart et al. . | |
| 5,775,108 | 7/1998 | Ansart et al. . | |

FOREIGN PATENT DOCUMENTS

| | | |
|---|---|---|
| 0 488 557 A1 | 6/1992 | European Pat. Off. . |
| 0 491 478 A1 | 6/1992 | European Pat. Off. . |
| 2 686 683 | 7/1993 | France . |
| 2 691 235 | 11/1993 | France . |
| 2 706 021 | 12/1994 | France . |

*Primary Examiner*—Ted Kim
*Attorney, Agent, or Firm*—Oblon, Spivak, McClelland, Maier & Neustadt, P.C.

[57] ABSTRACT

The invention relates to a combustion chamber containing a number of aeromechanical injectors mounted in the end of the chamber that connects the upstream end of two annular walls and which are supplied with fuel permanently during operation. The injectors are arranged in two concentric rows around the axis of symmetry and in pairs in longitudinal planes passing through the axis of symmetry. The injectors of the two rows are more or less equidistant from the outlet of the chamber and have axes directed toward the outlet. A carefully considered distribution of the primary holes, dilution holes and the air flow allows the emissions of oxides of nitrogen to be reduced.

7 Claims, 4 Drawing Sheets

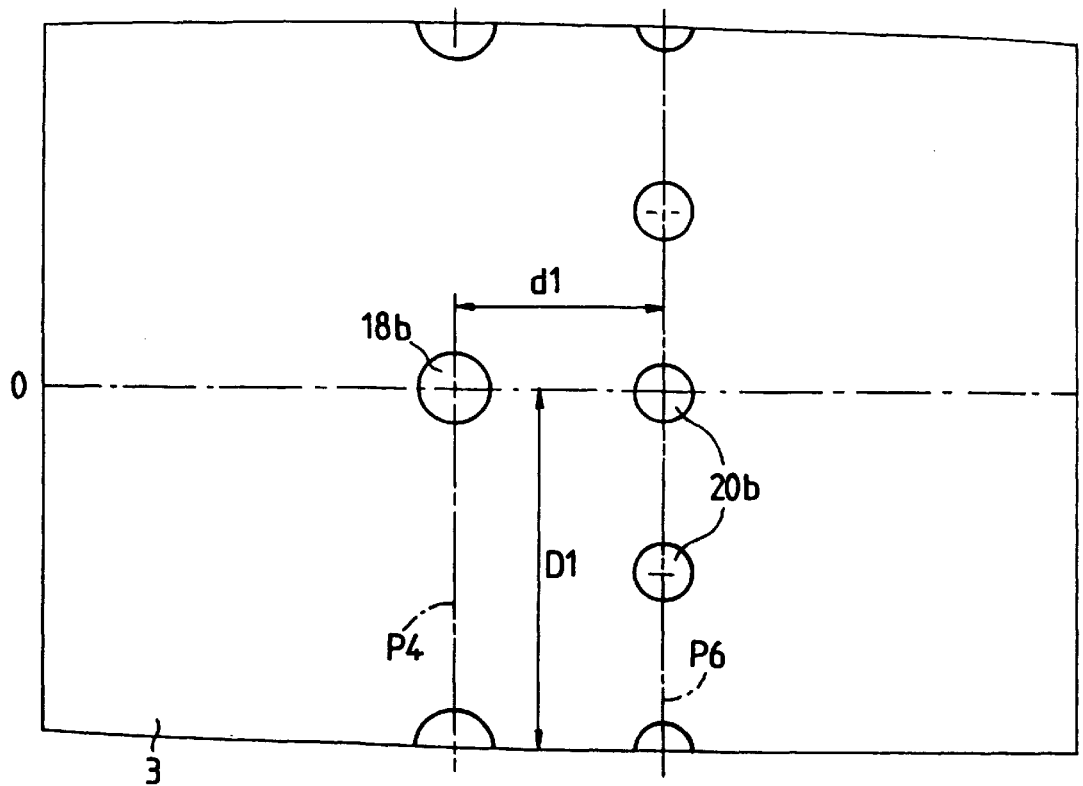
FIG.4
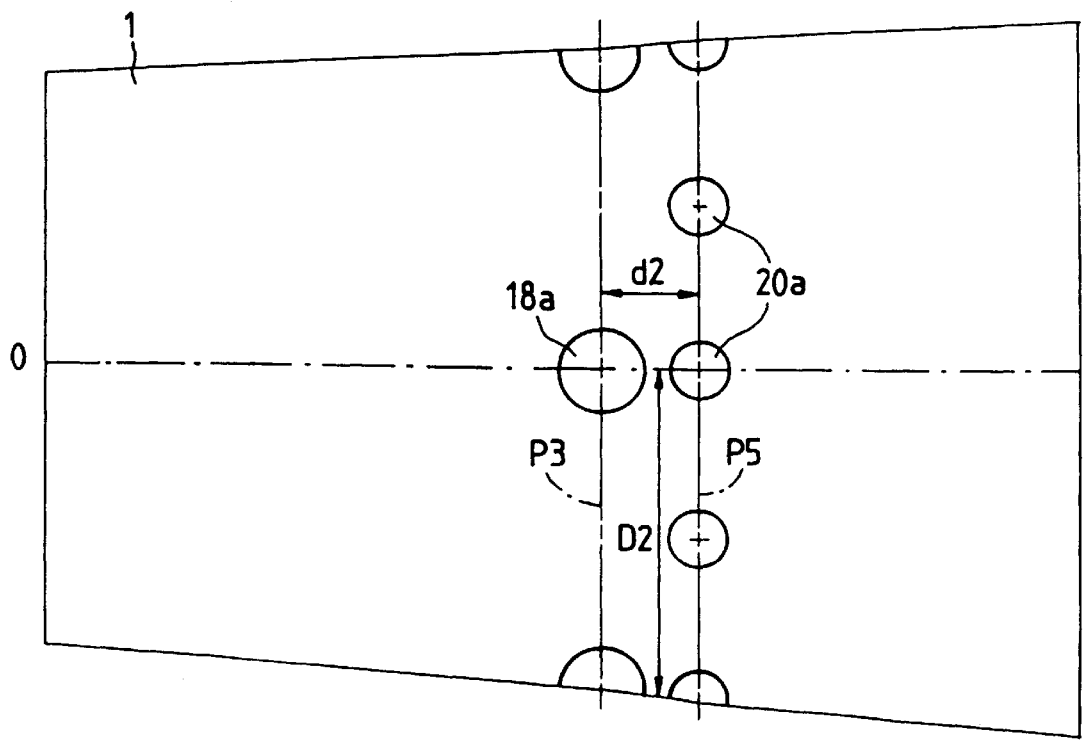

TURBOMACHINE COMBUSTION CHAMBER WITH INNER AND OUTER INJECTOR ROWS

BACKGROUND OF THE INVENTION

The invention relates to a combustion chamber for a turbomachine.

One of the prime objectives in the field of turbomachines used in aeronautics, especially for civil use but also for military use, is the reduction of atmospheric pollution and especially the reduction of the emission of oxides of nitrogen.

The production of oxides of nitrogen depends on the richness of the fuel-air mixture, temperature, compression ratios and length of combustion. It occurs in particular in regions of the combustion chamber in which the richness is close to the stoichiometric ratio and is all the greater, the higher the temperature and compression ratio. It is also advisable for the time of residence in these critical regions to be reduced, or for the size of these regions to be reduced.

The problem is all the more difficult to solve when the aviation turbomachines are subject to different flight speeds, particularly at idling speed and at full throttle speed for aircraft take-off.

French Patent Nos. 2 691 235; 2 706 021 and 2 686 683 propose combustion chambers in which the fuel injectors are split into two groups, the injectous of one of the groups being intended to supply fuel during a first operating mode, such as at idling speed, and the injectors of the other group being intended to supply fuel during a second operating mode, such as at full throttle speed. In these combustion chambers, the two groups of injectors are arranged concentrically in the end of the chamber and are separated by dividing plates which extend towards the inside of the chamber, so as to define two sections of different length in the combustion space, the shorter section being used at full throttle speed. These combustion chambers, known as double-head chambers, are complicated and cumbersome for a given maximum thrust, because the injectors for one of the heads are not operating for part of the flight and during take-off. Furthermore, in this type of chamber, the dividing plates have to withstand very high and often asymmetric mechanical and thermal stresses. They are, for these reasons, difficult to design and to manufacture.

The present invention proposes another solution, which is simpler than the previous ones and has other advantages for reducing the omissions of oxides of nitrogen.

SUMMARY OF THE INVENTION

The invention provides a combustion chamber comprising;

- an inner and an outer annular wall each generally centred on a common axis of symmetry;
- an end connecting the upstream portions of the annular walls and delimiting with the annular walls a combustion enclosure;
- an annular outlet for discharging combustion gases from the combustion enclosure defined by a downstream portion of the annular walls;
- a plurality of orifices formed in the said end;
- a plurality of fuel injectors arranged in the orifices and disposed to form an inner and an outer row each concentric about the said axis, each injector being of the aeromechanical type and being equipped with a bowl, said inner and outer rows of injectors each containing the same number of injectors uniformly distributed about the said common axis such that the injectors of both rows are situated in the same longitudinal planes which pass through the said common axis, and the injectors of said inner and outer rows being arranged substantially equidistant from said annular outlet and having their respective axes directed towards the annular outlet;
- means for continuously supplying the injectors with fuel during operation of the combustion chamber;
- an inner, an outer and a middle group of inlet passages for additional air formed in the said end, the inner group being situated between the inner annular wall and the bowls of the inner row of injectors, the outer group being situated between the outer annular wall and the bowls of the outer row of injectors and the middle group being situated between the bowls of the inner row of injectors and the bowls of the outer row of injectors;
- a plurality of primary holes formed in the annular walls and arranged to introduce a flow of air into a primary region of the combustion enclosure;
- a plurality of dilution holes formed in the annular walls downstream of the primary holes and arranged to introduce air into a dilution region of the combustion enclosure; and
- a plurality of cooling orifices arranged to cool the annular walls in the dilution region;
- the arrangement being such that, during operation, the proportions of injected air are about 26% at the injectors, 7.5% through the said inlet passages, 22.3% through the primary holes, 24.7% through the dilution holes and 19.5% through the cooling orifices relative to the total flow of air injected into the combustion enclosure.

The two rows of injectors preferably introduce about the same amount of air as of fuel.

The proportion of air injected through the passages is preferably split as follows: approximately 1.6% of the total flow is introduced through the inner group of passages, 3.5% through the middle group and 2.4% through the outer group.

The number of dilution holes is preferably equal to twice the number of primary holes.

The number of primary holes in each annular wall is preferably equal to twice the number of injectors in each row of injectors.

The dilution holes formed in an annular wall are preferably situated in a transverse plane separated from the transverse plane containing the primary holes of the same wall by a distance d shorter than the distance D separating two adjacent primary holes.

If L indicates the length of the combustion enclosure and H indicates its maximum radial width, the ratio of the length L to the width H is preferably greater than or equal to 1.2.

Other advantages and preferred features of the invention will become apparent from the following description of the preferred embodiment, given by way of example, with reference to the appended drawings.

BRIEF DESCRIPTION OF THE DRAWINGS

FIG. 4 is a development of the inner and outer walls of the combustion chamber of FIG. 1 in the region of the primary and dilution holes.

DESCRIPTION OF THE PREFERRED EMBODIMENT

Figure 1:
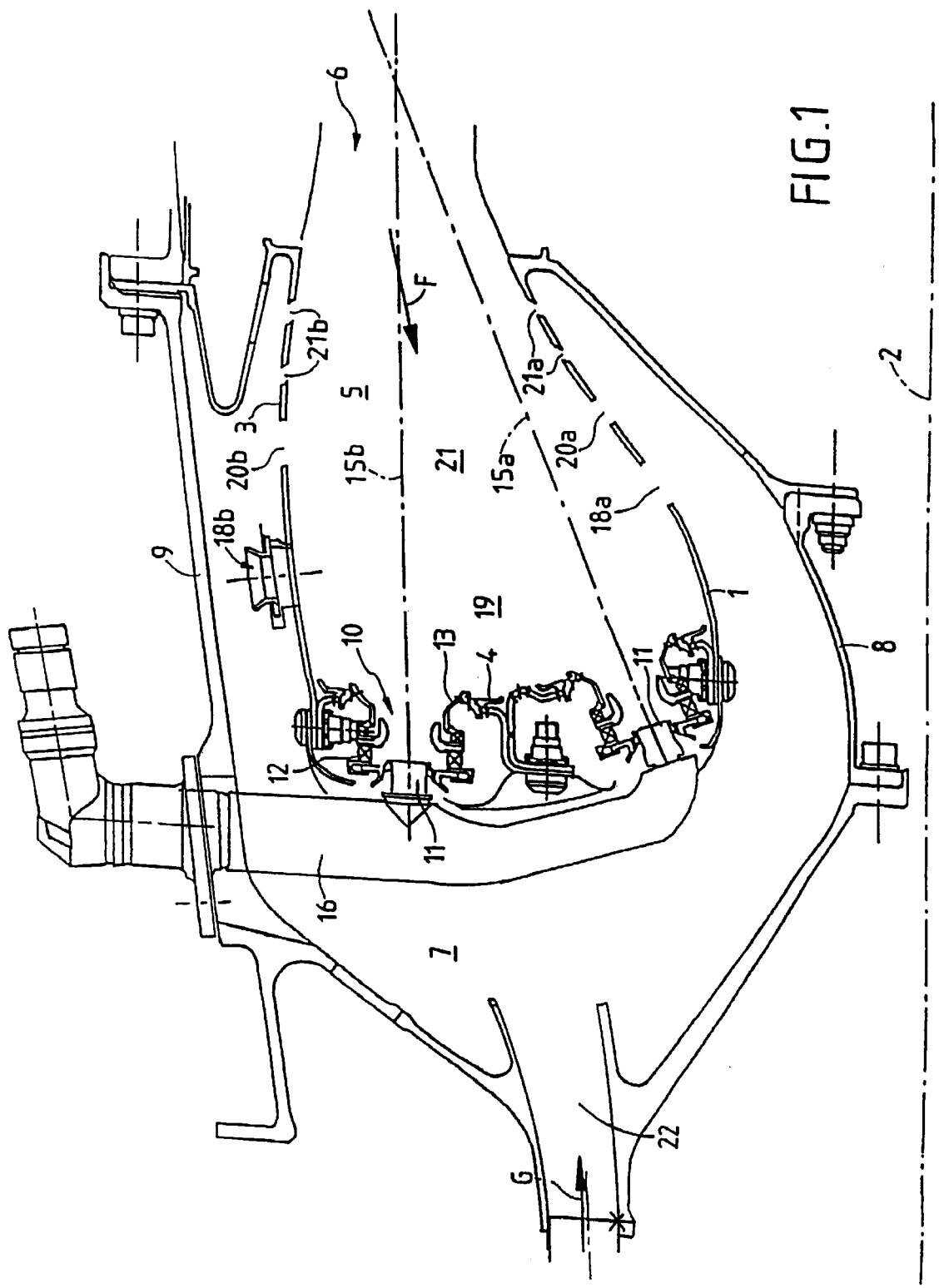
FIG. 1 is an axial section through one embodiment of a combustion chamber in accordance with the invention.

The gas turbine combustion chamber depicted in the drawings comprises an inner annular wall 1 having a central axis 2, an outer annular wall 3 having the same central axis 2, and an end 4 which, with these two annular walls 1 and 3, delimits a combustion enclosure 5. The combustion enclosure 5 has, at the ends of the walls 1 and 3 furthest from the end 4, an annular outlet 6 centred about the axis 2 for discharging the combustion gases toward a turbine placed downstream of the combustion enclosure 5. The combustion enclosure 5 is in a space 7 delimited by an inner casing 8 and an outer casing 9 which are annular, about the axis 2, and into which a flow G of an oxidizing agent under pressure (typically air pressurized by a compressor driven by the turbine) is admitted.

The end 4 has a number of orifices 10, in each of which there is placed a fuel injector 11 of the aeromechanical type. Each injector 11 is associated with a swirl inducer 12 for introducing a flow of air that improves vaporization and atomization of the fuel, and with a bowl 13 which widens toward the outlet 6 and forms part of the end 4 of the combustion chamber.

Figure 2:
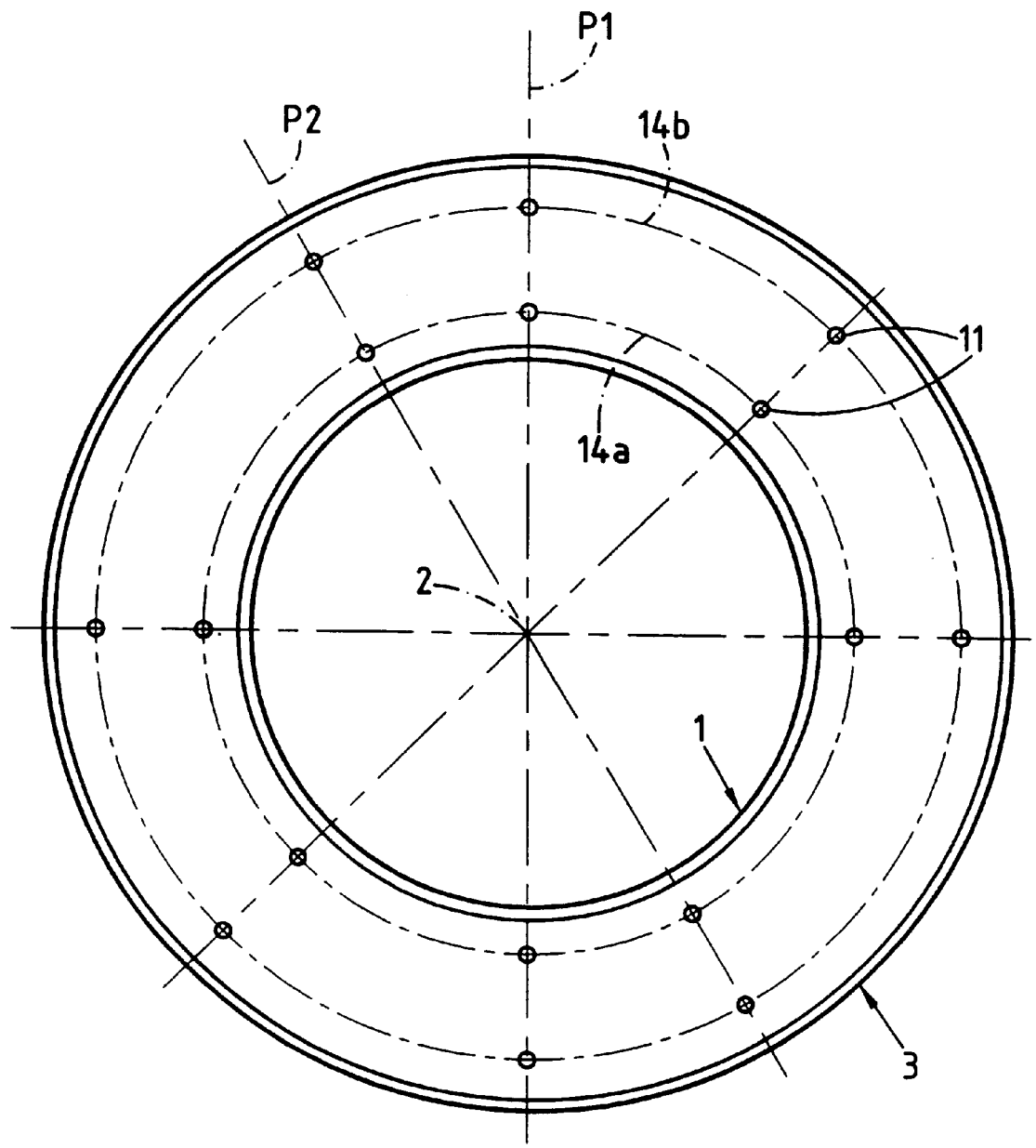
FIG. 2 is a view in the direction of arrow F of FIG. 1, which shows the arrangement of the injectors in the end of the chamber.
Figure 3:
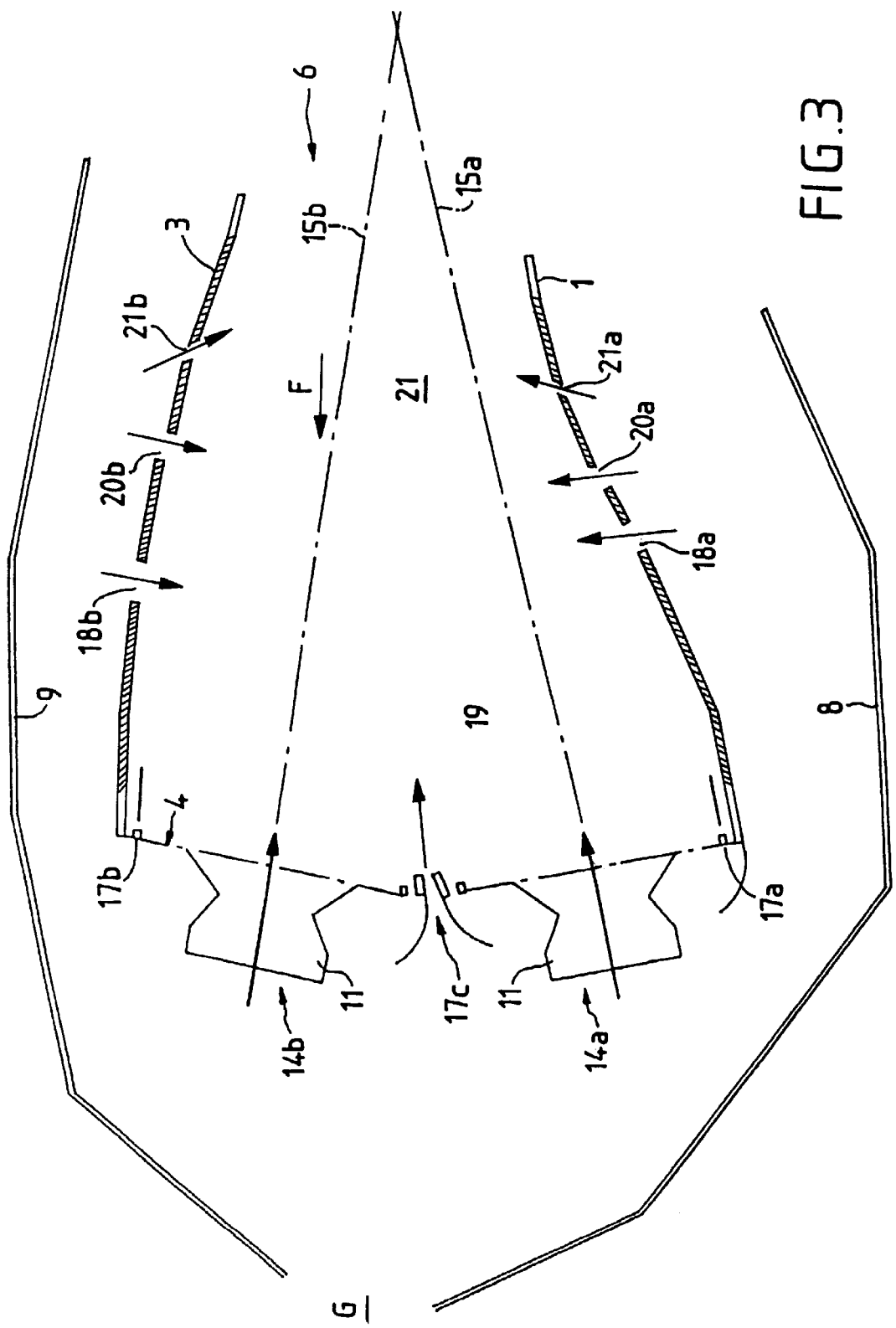
FIG. 3 is a diagrammatic axial section through the combustion chamber of FIG. 1, which shows the optimum distribution of the flows of air introduced into the space of the combustion chamber through the various orifices.

As can be seen in FIGS. 1 and 2, the fuel injectors 11 are split into two rows 14a, 14b concentric about axis 2.

The two rows of injectors 14a, 14b contain the same number N of injectors uniformly distributed circumferentially about the axis 2 and in the same longitudinal planes P1, P2 containing the axis 2. The axes 15a of the injectors of the inner row 14a are directed toward the outlet 6 from the enclosure 5, and the axes 15b of the injectors of the outer row 14b are also directed toward the outlet 6, in such a way that the axes 15a, 15b of two superposed injectors 11 (i.e. in the same longitudinal plane) intersect more or less in the region of the outlet 6. The two superposed injectors are connected to the same fuel feed line 16.

The injectors 11 of the two rows 14a, 14b are generally equidistant from the outlet 6 and are supplied at the same time and permanently during operation. Furthermore, there are no dividing plates between the two rows 14a, 14b of injectors.

In addition to the swirl-inducers 12 for introducing air into the combustion enclosure, there are also provided, in the end 4, passages for introducing additional air. These passages are split into three groups: an inner passage group 17a situated between the inner annular wall 1 and the bowls of the injectors of the inner row 14a, an outer passage group 17b situated between the outer annular wall 3 and the bowls of the injectors of the outer row 14a, and a middle passage group 17c situated between the bowls of the injectors of the inner row 14a and the bowls of the injectors of the outer row 14b.

The inner wall 1 and outer wall 3 also have primary holes 18a, 18b for introducing a flow of air into the primary region 19 of the enclosure 5, which holes are uniformly distributed in transverse planes P3, P4 perpendicular to the axis of symmetry 2, and dilution holes 20a, 20b for introducing a flow of dilution air into the dilution region 21 of the enclosure 5, which holes are uniformly distributed in transverse planes P5, P6 perpendicular to the axis of symmetry 2.

The number of primary holes 18a, 18b in each of the walls 1 and 3 is equal to twice the number of injectors N in each row of injectors 14a, 14b, whereas the number of dilution holes 20a, 20b is equal to twice the number of primary holes.

As is shown in FIG. 4, the distance d1 which separates the two planes P4 and P6 is shorter than the distance D1 between two consecutive primary holes 18b in the outer wall 3. Likewise, the distance d2 separating the two planes P3 and P5 is shorter than the distance D2 between two consecutive primary holes 18a in the inner wall 1. Furthermore, this distance d2 is shorter than the distance d1 and more or less equal to half of the latter.

Downstream of the dilution holes 20a, 20b, the inner wall 1 and outer wall 3 also comprise cooling orifices 21a, 21b for introducing air for cooling these walls.

The flow of air G introduced into the space 7 supplies the combustion enclosure 5 with the following distribution.

About 13% of the flow G is introduced through the injectors 11 of each row 14a, 14b.

About 7.5% of the flow G is introduced through the passages 17a, 17b, 17c with 1.6% entering via the group of inner passages 17a, 2.4% entering via the group of outer passages 17b and 3.5% entering via the group of middle passages 17c.

About 10.2% of the flow G is introduced through the primary holes 18a, and 12.1% through the primary holes 18b.

About 11.8% of the flow G is introduced through the dilution holes 20a in the inner wall 1, and 12.9% through the dilution holes 20b in the outer wall 3.

Finally, about 9.2% is introduced through the cooling orifices 21a, and 10.3% through the cooling orifices 21b.

This distribution of the air flow makes it possible to obtain an injector equivalence ratio of about 1.8 at full throttle and an equivalence ratio in the primary region of below 0.86 with a richness of 32.6% at full throttle. This assumes that the equivalence ratio is the ratio of the richness in the region compared to the stoichiometric richness, the richness in the region being the ratio between the flow of fuel and flow of air in the region.

Calculations have verified that the type of distribution described above allows the emissions of oxides of nitrogen to be reduced to a minimum. Further improvement is achieved when the dilution holes 20a, 20b are close to the primary holes 18a, 18b.

Considering the overall design of the combustion chamber, if the length of the enclosure 5 is denoted by L and its maximum radial width is denoted by H, it can be seen that the absence of a divider between the two rows of injectors 14a, 14b allows the outer and inner heads to be brought closer together. This makes it possible to obtain a ratio between the length L and its radial width H greater than or equal to 1.2 whereas this value is equal to 1 in conventional double-head annular chambers. This being the case, the chamber can be supplied with air using a single-flow diffuser 22 without increasing the pressure drop induced by flowing round it.

Finally, the inclination of the axes 15a of the injectors 11 of the inner row 14a being parallel to the mean line of the inner wall 1 improves the level of thermal stresses in this wall while still allowing the injectors 11 to be fitted and removed.

We claim:

1. A combustion chamber comprising;

an inner and an outer annular wall each generally centred on a common axis of symmetry;

an end connecting upstream portions of the annular walls and delimiting with the annular walls a combustion enclosure;

an annular outlet for discharging combustion gases from the combustion enclosure defined by a downstream portion of the annular walls;

a plurality of orifices formed in the said end;

a plurality of fuel injectors arranged in the orifices and disposed to form an inner and an outer row each concentric about the said axis, each injector being of the aeromechanical type and being equipped with a bowl, said inner and outer rows of injectors each containing the same number of injectors uniformly distributed about the said common axis such that the injectors of both rows are situated in the same longitudinal planes which pass through the said common axis, and the injectors of said inner and outer rows being arranged substantially equidistant from said annular outlet and having their respective axes directed towards the annular outlet;

means for continuously supplying the injectors with fuel during operation of the combustion chamber;

an inner, an outer and a middle group of inlet passages for additional air formed in the said end, the inner group being situated between the inner annular wall and the bowls of the inner row of injectors, the outer group being situated between the outer annular wall and the bowls of the outer row of injectors and the middle group being situated between the bowls of the inner row of injectors and the bowls of the outer row of injectors;

a plurality of primary holes formed in the annular walls and arranged to introduce a flow of air into a primary region of the combustion enclosure;

a plurality of dilution holes formed in the annular walls downstream of the primary holes and arranged to introduce air into a dilution region of the combustion enclosure; and a plurality of cooling orifices arranged to cool the annular walls in the dilution region;

the arrangement being such that, during operation, the proportions of injected air are about 26% at the injectors, 7.5% through the said inlet passages, 22.3% through the primary holes, 24.7% through the dilution holes and 19.5% through the cooling orifices relative to the total flow of air injected into the combustion enclosure.

2. A combustion chamber as claimed in claim 1, wherein the two rows of injectors introduce approximately the same amount of air as of fuel.

3. A combustion chamber as claimed in claim 1 wherein the proportion of air injected through the inlet passages is distributed as follows: about 1.6% of the total flow is introduced through the inner group, 3.5% through the middle group and 2.4% through the outer group.

4. A combustion chamber as claimed in claim 1, wherein the number of dilution holes is equal to twice the number of primary holes.

5. A combustion chamber as claimed in claim 4, wherein the number of primary holes in each of the annular walls is equal to twice the number of injectors in each row of injectors.

6. A combustion chamber as claimed in claim 1, wherein the dilution holes formed in one annular wall are situated in a transverse plane separated from the transverse plane containing the primary holes in the same wall by a distance shorter than the distance separating two adjacent primary holes.

7. A combustion chamber as claimed in claim 1, wherein the ratio of the length of the combustion enclosure to its maximum radial width is greater than or equal to 1.2.

* * * * *